US012798906B2

(12) United States Patent
Salmi

(10) Patent No.: US 12,798,906 B2
(45) Date of Patent: Nov. 17, 2026

(54) CONVEYOR TRACK AND PALLET FOR A CONVEYOR TRACK

(71) Applicant: FLEXLINK AB, Gothenburg (SE)

(72) Inventor: Marko Salmi, Gothenburg (SE)

(73) Assignee: FLEXLINK AB, Gothenburg (SE)

( * ) Notice: Subject to any disclaimer, the term of this patent is extended or adjusted under 35 U.S.C. 154(b) by 0 days.

(21) Appl. No.: 18/848,670

(22) PCT Filed: Mar. 28, 2023

(86) PCT No.: PCT/EP2023/058045
§ 371 (c)(1),
(2) Date: Sep. 19, 2024

(87) PCT Pub. No.: WO2023/186927
PCT Pub. Date: Oct. 5, 2023

(65) Prior Publication Data

US 2025/0206547 A1 Jun. 26, 2025

(30) Foreign Application Priority Data

Mar. 28, 2022 (SE) .................................... 2250377-5
Mar. 28, 2022 (SE) .................................... 2250378-3

(51) Int. Cl.
*B65G 54/02* (2006.01)

(52) U.S. Cl.
CPC .................................... *B65G 54/02* (2013.01)

(58) Field of Classification Search
CPC ...... B65G 54/02; B65G 37/00; B65G 37/005; B65G 39/18
USPC .............................. 198/610, 805, 465.1, 619
See application file for complete search history.

(56) References Cited

U.S. PATENT DOCUMENTS

| | | | |
|---|---|---|---|
| 4,235,187 A | 11/1980 | Mirza | |
| 5,054,601 A | 10/1991 | Sjogren et al. | |
| 6,540,064 B1 | 4/2003 | Bodewes et al. | |
| 6,876,107 B2 * | 4/2005 | Jacobs .............. | B29C 66/83413 318/135 |

(Continued)

FOREIGN PATENT DOCUMENTS

| | | | |
|---|---|---|---|
| AT | 525147 A1 | 11/2022 | |
| EP | 3656709 B1 | 1/2022 | |
| WO | WO 2021/038728 A1 | 3/2021 | |

OTHER PUBLICATIONS

Swedish Search Report for Swedish Application No. 2250377-5, dated Mar. 28, 2022, 6 pages.

(Continued)

*Primary Examiner* — William R Harp
(74) *Attorney, Agent, or Firm* — Alston & Bird LLP

(57) ABSTRACT

Conveyor track (100) comprising an endless conveyor (101) and a linear magnetic conveyor (102), where the endless conveyor (101) comprise support rails (103) arranged at each side of the endless conveyor (101), and where the linear magnetic conveyor (102) comprise guide rails (105) arranged at each side of the magnetic conveyor (102), wherein the centre axle (106) of the guide rails (105) is inclined with respect to a horizontal direction. The advantage of the invention is that a conveyor track is provided, where pallets can be positioned in a quick and precise manner. This allows for a flexible and quick handling of pallets.

22 Claims, 5 Drawing Sheets

(56) References Cited

U.S. PATENT DOCUMENTS

| | | | | |
|---|---|---|---|---|
| 7,597,187 | B2 * | 10/2009 | Bausenwein | B41F 13/00 198/619 |
| 8,511,235 | B2 | 8/2013 | Fukukawa et al. | |
| 10,569,974 | B2 * | 2/2020 | Neubauer | H02N 15/00 |
| 10,608,518 | B2 * | 3/2020 | Brucker | H02K 41/031 |
| 10,981,729 | B2 | 4/2021 | Deuser | |
| 11,831,216 | B2 * | 11/2023 | Nakagome | B65G 54/02 |
| 2006/0032728 | A1 | 2/2006 | Smith et al. | |
| 2010/0084247 | A1 | 4/2010 | Wipf et al. | |
| 2015/0027338 | A1 | 1/2015 | Aumann et al. | |
| 2015/0144462 | A1 | 5/2015 | Weiss | |
| 2016/0257502 | A1 | 9/2016 | Fujihara et al. | |
| 2019/0389675 | A1 | 12/2019 | Kleinikkink et al. | |
| 2020/0003257 | A1 | 1/2020 | Neufeld et al. | |
| 2020/0307920 | A1 | 10/2020 | Ragan | |

OTHER PUBLICATIONS

International Search Report and Written Opinion for Patent Cooperation Treaty Application No. PCT/EP2023/058045, dated Jul. 20, 2023, 13 pages.

Chinese Application No. 202380029696.8 Office Action and Search Report dated Sep. 22, 2026, 9 pgs.

* cited by examiner

CONVEYOR TRACK AND PALLET FOR A CONVEYOR TRACK

CROSS REFERENCE TO RELATED APPLICATIONS

This application is a National Stage Application, filed under 35 U.S.C. § 371, of International Application No. PCT/EP2023/058045, filed Mar. 28, 2023, which international application claims priority to and the benefit of Swedish Application No. 2250377-5, filed Mar. 28, 2022, and Swedish Application No. 2250378-3, filed Mar. 28, 2022; the contents of all of which are hereby incorporated by reference in their entireties.

BACKGROUND

Related Field

The present invention relates to a conveyor track comprising an endless conveyor and a linear magnetic conveyor. The conveyor track is adapted to convey a pallet with a high precision. The present invention also relates to a pallet adapted to be conveyed by a conveyor track comprising an endless conveyor and a linear magnetic conveyor

Description of Related Art

Conveying devices, such as those that are used for moving objects between different stations in a factory, usually comprise a conveying track in the form of an endless belt or an endless chain. Conveyor belts may be used for straight conveyor systems, where the product is conveyed in a single direction, or when the product is diverted from one straight belt to another straight belt. In conveyor systems where the product is to pass through bends and curves, an endless plastic chain conveyer is of advantage. The conveying tracks can be recessed in a trench with vertical side surfaces. Alternatively, they can be located on the horizontal upper surfaces of the trench or arranged in some other way. The objects to be conveyed are arranged slidably in relation to the conveying tracks, either directly or via carrying means, which are also known as pallets. A pallet may be provided with a specific holder adapted to hold the product in a secure way, such that it does not fall off.

A pallet is conveyed along the conveying system, which at least comprises a loading station and an unloading station, and that may also comprise different work stations. At a workstation, the pallet can be stopped with a mechanical stop device such that the pallet stands still at the workstation. At the workstation, an operation may be performed on the transported product.

In some cases, the product may pass a specific workstation without an operation being performed on the object. When a pallet is stopped, it will glide on the conveyor chain that continues to move and to convey other pallets on the conveyor chain. Such a conveyor system is suited to transport single products or pallets with a relatively slow speed, where the pallets does not have to stop very often.

In other conveyor systems, where a higher speed is required, and where several stops have to be made, straight conveyor belts with fixed product holders are often used, often referred to as racetrack systems. A racetrack system comprises two conveyor belts, where each belt is provided with a number of fixed product holders, adapted to the number and size of products that are to be conveyed. At a loading station, the racetrack will collect products that may arrive individually on a single conveyor, where each product is loaded in a product holder. When a product is loaded in a product holder, the belt advances to the next product holder such that a new product can be loaded. When all product holders are loaded, the belt advances to the unloading station where the batch of products are unloaded at the same time, e.g. to a carton holding several products in rows and columns.

At the same time, the empty product holder of the other belt is positioned at the loading station, where the empty product holders are loaded with new products. Each belt is driven with a servomotor that allows quick movement and precise stopping position at a high speed. Such a system is well suited when single products are to be grouped in batches, where a batch may be packed in a single package or when several batches are packed in a package.

Such a racetrack system is well adapted for large production runs where the system must not be adapted for different products. Since the product holders are fixed on the conveyor belts, this solution is inflexible, and the product holders can only be changed with great efforts. Such a system is also only adapted for one type of product. Further, there is no possibility to arrange a buffer between the loading station and the unloading station, and the system cannot convey pallets holding products.

In some conveyor systems, a combination of an endless plastic conveyor chain and a linear magnetic conveyor is used. In such a system, a pallet is conveyed by the chain conveyor from a loading station to the magnetic conveyor, where the pallet is conveyed by the linear magnetic conveyor. The pallet can be conveyed with a high speed, and can be stopped at several defined positions in an easy way, without the need to use specific stop devices. The magnetic conveyor can control each pallet individually with a high precision and with a high speed. Such a system may e.g. be used for loading several consecutive products on a pallet, The pallet will stand on the conveyor chain and will be conveyed by the friction between the chain and the pallet. At the linear magnetic conveyor, the pallet will be conveyed by magnetic force.

It is thus important that the bottom surface of the pallet is positioned with a small airgap between the pallet and the magnetic conveyor in order to avoid friction between the pallet and the surface of the magnetic conveyor. It is also important that the distance between the pallet and the magnetic conveyor is the same over the complete magnetic conveyor.

In known magnetic conveyors, the pallets are guided by horizontal and vertical wheels or bearings, such that the distance between the bottom of the pallet and the surface of the magnetic conveyor is constant. The pallet is also guided sideways such that the friction is as low as possible. In some systems, the pallet is guided with wheels running in tracks on each side of the conveyor, or is guided by sliding elements.

Such conveyor systems or pallets may function acceptable, but there is still room for an improved conveyor track and for an improved pallet for a conveyor track.

BRIEF SUMMARY

An object of the invention is therefore to provide an improved conveyor track. An object of the invention is also to provide an improved pallet for a conveyor track comprising an endless conveyor and a linear magnetic conveyor. Still a further object of the invention is to provide an improved conveyor system comprising such a pallet.

The solution to the problem according to the invention is described in the claims. The sub claims contain advantageous embodiments and further developments of the conveyor track.

In a conveyor track comprising an endless conveyor and a linear magnetic conveyor, where the endless conveyor comprises a support rail arranged at each side of the endless conveyor, and where the linear magnetic conveyor comprises a guide rail arranged at each side of the magnetic conveyor, the object of the invention is achieved in that that the guide rail arranged at each side of the magnetic conveyor is inclined with respect to a horizontal direction.

By this first embodiment of the conveyor track according to the invention, a conveyor track that conveys a pallet with both an endless conveyor and a linear magnetic conveyor is provided. The endless conveyor may e.g. be a chain conveyor, a belt conveyor or a roller conveyor. With such a conveyor track, a pallet can be forwarded to the magnetic conveyor in a relatively slow and continuous flow. At the magnetic conveyor, the pallet can be controlled individually with regards to speed and position, which allows for a flexible positioning of a product. Products may e.g. be loaded onto the pallet at one or more positions, a product may be positioned at a workstation or a product may be unloaded from the pallet at a specific position. The pallet can be conveyed with a high speed to a specific position, where it may be stopped or conveyed with a low speed until an operation is completed, and can be conveyed with a high speed from the specific position.

The endless conveyor is aligned with linear magnetic conveyor in a transition area where the pallet is arranged to transfer from the endless conveyor to the magnetic conveyor, and vice versa. This enables a linear motion of the pallet during the transition from the endless conveyor to the magnetic conveyor.

The conveyor track is provided with guide rails arranged to support and guide the pallet at the magnetic conveyor. The guide rails are in one example pointed and inclined, such that they will support the pallet in a vertical direction and will guide the pallet in a horizontal direction. The guide rails may also be convex and semi-circular. The pointed guide rail is provided with an upper bearing surface and a lower bearing surface, where the upper bearing surface will carry the load of the pallet, and the lower bearing surface will guide the pallet sideways. The pallet is provided with pulley wheels that are provided with a groove that corresponds to the shape of the guide rail. The groove may be a V-shaped groove arranged to cooperate with a pointed guide rail, or may be a semi-circular concave groove arranged to cooperate with a semi-circular guide rail. The pulley wheels are arranged with the rotational axle being inclined with respect to a horizontal direction, where the rotational axle of a pulley wheel is perpendicular to the centre axle of the guide rail.

The guide rail may also be provided with a groove that is V-shaped and adapted to cooperate with pointed guide wheels, or may be provided with a concave and semi-circular groove adapted to cooperate with convex and semi-circular guide wheels.

According to some example embodiments, the guide rails are configured to support and guide the pallet over a gap between the endless conveyor and the magnetic conveyor during a transition of the pallet from the endless conveyor to the magnetic conveyor.

The conveyor track is further provided with support rails arranged at the sides of the endless conveyor. The support rails will support the pallet sideways when the pallet is conveyed by the endless conveyor, and the pallet will slide against the support rail on gliding surfaces arranged on the body of the pallet in a conventional manner.

In other words, the pallet will stand on a horizontal conveying surface of the endless conveyor and will be conveyed by the friction between the conveying surface and the pallet, while the support rails will support the pallet sideways, for ensuring that the pallet stays on the endless conveyor and does not fall off the endless conveyor sideways.

The support rails are mounted on mounting brackets that are mounted to the conveyor beam.

The guide rails are arranged on side supports of the magnetic conveyor, and are in the shown example arranged at a height that is lower than the support rails. This allows for a compact solution, since the pulley wheels are arranged below the gliding surface of the pallet.

In order to allow for a smooth transfer of the pallet from the endless conveyor to the magnetic conveyor, the end region of a guide rail is provided with a curved entrance section. The entrance section ensures that the transition from the endless conveyor to the magnetic conveyor is smooth without any vibrations or rattle. The entrance section is arranged at the end region of the endless conveyor such that the pallet will engage with the entrance section before the pallet leaves the endless conveyor. The entrance section is curved and slightly inclined such that the guide wheels of the pallet are gently guided onto the guide rails, where they are supported by the guide rail.

Consequently, according to some example embodiments, an end region of the guide rails are provided with a curved entrance section in order to allow for a smooth transfer of the pallet from the endless conveyor to the magnetic conveyor.

During a transition from the endless conveyor to the magnetic conveyor, the front guide wheels will engage the guide rail, which will guide and support the pallet at the front part while the rear part is driven by the endless conveyor. The guide rail will lift the pallet slightly, such that the front part does not bear on the endless conveyor. Thereafter, the rear guide wheels will engage the guide rail and the pallet will be driven only by the magnetic conveyor, since the rear part is also lifted slightly. By holding the pallet with the guide rails during the transition from the endless conveyor to the magnetic conveyor, the pallet will be guided over the gap between the endless conveyor and the magnetic conveyor.

Consequently, according to some example embodiments, the entrance section of the guide rails is arranged at the end region of the endless conveyor such that the pallet will engage with the entrance section before the pallet leaves the endless conveyor.

The guide rails will hold the pallet such that there is an air gap between the bottom of the pallet and the surface of the magnetic conveyor. The height of the air gap is preferably between 0.2 to 0.8 mm.

Consequently, according to some example embodiments, the guide rails are configured to hold the pallet such that there is an air gap between the bottom of the pallet and an upper surface of the magnetic conveyor.

In one example, the magnets at the bottom of the pallet are arranged in a symmetric manner. In this way, the pallet does not have a specific orientation and can be driven and used in any direction. In another example, the magnets at the bottom of the pallet are arranged closer to one end of the pallet, e.g. closer to the front end of the pallet with less magnets at the rear of the pallet. This will allow the pallet to be driven by the magnetic conveyor earlier. The magnets will in one example extend further to the front than the front guide wheels and will not extend behind the rear guide wheels. This will simplify the transition of the pallet from the endless conveyor to the magnetic conveyor. In this example, the pallet is directional.

The inventive conveyor track comprises a linear magnetic conveyor, and the pallet is provided with magnetic means such that it can be driven by the magnetic conveyor. In this way, it is possible to control the movement of the pallet in a quick and very precise manner, such that the pallet can be positioned in exactly defined positions, e.g. at a delivery position or a workstation. The movement between two positions can further be performed in a quick manner.

The linear motor of linear magnetic conveyor may for example include a plurality of electromagnetic coils that control the movement of the pallet along the length of the magnetic conveyor.

According to some example embodiments of the conveyor track, the guide rails comprises an upper bearing surface arranged to support the pallet in a vertical direction and a lower bearing surface arranged to guide the pallet in a sideway direction.

According to some example embodiments of the conveyor track, the upper bearing surface and the lower bearing surface of the guide rails are divided by the centre axle of the guide rail, wherein the centre axle of the guide rail is perpendicular to a longitudinal direction of the guide rail, i.e. perpendicular to an intended motion direction of a pallet moving along the conveyor track.

A pallet for the conveyor track may be provided with a product holder adapted to hold one or more products, or may be provided with other types of devices. This may e.g. include mechanical or electrical devices, such as tilt trays, belt conveyors, format changers, test equipment, etc. When a new product is to be handled, the product holder may be replaced with another product holder, e.g. by using a quick release, or the pallet may be replaced with another pallet having a different product holder. It is also possible to use pallets with different product holders at the same time.

The present disclosure also relates to a pallet for a conveyer track comprising an endless conveyor and a linear magnetic conveyor, comprising a body having a front side, a rear side, a right side, a left side, an upper side and a bottom side, where the right side is provided with a first guide wheel and a second guide wheel, where the left side is provided with a third guide wheel and a fourth guide wheel, and where the bottom side of the pallet is provided with a magnetic material, the object of the invention is achieved in that that the rotational axle of each guide wheel is inclined with respect to a vertical direction.

By this first embodiment of the pallet according to the invention, a pallet that is adapted to be conveyed by a conveyor track comprising both an endless conveyor and a linear magnetic conveyor is provided. With such a conveyor track, a pallet can be forwarded to the magnetic conveyor in a relatively slow and continuous flow by the endless conveyor. At the magnetic conveyor, the pallet can be controlled individually with regards to speed and position, which allows for a flexible positioning of a product. Products may e.g. be loaded onto the pallet at one or more positions, a product may be positioned at a workstation or a product may be unloaded from the pallet at a specific position. The pallet can be conveyed with a high speed to a specific position, where it may be stopped or conveyed with a low speed until an operation is completed, and can be conveyed with a high speed from the specific position.

The conveyor track comprises a linear magnetic conveyor, and the pallet is provided with magnetic means such that it can be driven by the magnetic conveyor. In this way, it is possible to control the movement of the pallet in a quick and very precise manner, such that the pallet can be positioned in exactly defined positions, e.g. at a delivery position or a workstation. The movement between two positions can further be performed in a quick manner.

The pallet is longitudinal with a somewhat rectangular shape, where the front side and the rear side are curved. The right side is provided with a first guide wheel and a second guide wheel adapted to bear on a guide rail at the magnetic conveyor, and the left side is provided with a third guide wheel and a fourth guide wheel adapted to bear on a guide rail at the magnetic conveyor. The guide wheels of both sides are arranged at the same height and symmetrical with respect to the front side and the rear side of the pallet. The guide wheels are further inclined with respect to a vertical direction. The inclination plane of a guide wheel is the same as the inclination of the centre plane of the guide rails. The rotational axle of each guide wheel is perpendicular to the inclination plane. The pallet is provided with a stop lug at each side of the pallet, which can be used to stop a pallet with a stop member at e.g. a workstation.

Each guide wheel is provided with a groove adapted to cooperate with a guide rail at the magnetic conveyor. In one example, the groove is V-shaped having a first bearing surface and a second bearing surface. The first bearing surface will bear on the upper bearing surface of a guide rail and will carry the load of the pallet. The second bearing surface will interact with the lower bearing surface of a guide rail such that the pallet is guided in a sideway direction. The groove of the guide wheels may also be concave and semi-circular, adapted to cooperate with a convex and semi-circular guide rail. With a semi-circular shape, the horizontal part of the groove will carry the load of the pallet, and the vertical part of the groove will guide the pallet in a sideway direction.

The bottom side of the pallet is provided with a support surface at the front part and the rear part of the pallet, on which the pallet stands when it is conveyed by the endless conveyor. The bottom part of the pallet is provided with a magnetic material. The magnetic material may be permanent magnets or a magnetic material such as steel. The magnetic conveyor will drive the pallet by inducing a magnetic field to the magnetic material.

The pallet may be provided with a product holder adapted to hold one or more products, or may be provided with other types of devices. This may e.g. include mechanical or electrical devices, such as tilt trays, belt conveyors, format changers, test equipment, etc. When a new product is to be handled, the product holder may be replaced with another product holder, e.g. by using a quick release, or the pallet may be replaced with another pallet having a different product holder. It is also possible to use pallets with different product holders at the same time.

The conveyor track is provided with guide rails arranged to support and guide the pallet at the magnetic conveyor. The guide rails are inclined, such that they will support the pallet in a vertical direction and will guide the pallet in a horizontal direction. The guide rails may be pointed or semi-circular, and are provided with an upper bearing surface and a lower bearing surface, where the upper bearing surface will carry the load of the pallet, and the lower bearing surface will guide the pallet sideways. The guide wheels of the pallet are provided with grooves that corresponds to the shape of the guide rail.

The conveyor track is provided with support rails arranged at the sides of the endless conveyor. The support rails will support the pallet sideways when the pallet is conveyed by the endless conveyor, and the pallet will slide against the support rail on gliding surfaces arranged on the body of the pallet in a conventional manner. The guide rails are arranged on side supports of the magnetic conveyor, and are in the shown example arranged at a height that is lower than the support rails. This allows for a compact solution, since the bearing surface of the guide wheels are arranged below the gliding surface of the pallet.

The guide rails will hold the pallet such that there is an air gap between the bottom of the pallet and the surface of the magnetic conveyor. The height of the air gap is preferably between 0.2 to 0.8 mm.

In one example, the magnets at the bottom of the pallet are arranged in a symmetric manner. In this way, the pallet does not have a specific orientation and can be driven and used in any direction. In another example, the magnets at the bottom of the pallet are arranged closer to one end of the pallet, e.g. closer to the front end of the pallet with less magnets at the rear of the pallet. This will allow the pallet to be driven by the magnetic conveyor earlier. The magnets will in one example extend further to the front than the front guide wheels and will not extend behind the rear guide wheels. This will simplify the transition of the pallet from the chain conveyor to the magnetic conveyor. In this example, the pallet is directional.

According to some example embodiments of the pallet, the guide wheels are inclined with respect to a horizontal direction.

Consequently, according to some example embodiments, the rotational axle of each guide wheel may be inclined with respect to both the vertical direction and the horizontal direction.

According to some example embodiments of the pallet, the right side and the left side of the body are provided with a gliding surface arranged to interact with support rails of an endless conveyor.

According to some example embodiments of the pallet, the bottom side of the body is provided with a support surface at a front part and a rear part of the pallet, wherein the pallet is configured to stand on the support surface when the pallet is conveyed by the endless conveyor.

According to some example embodiments of the pallet, the guide wheels are provided with a first bearing surface and a second bearing surface, where the first bearing surface is arranged to bear on an upper bearing surface of a guide rail of a linear magnetic conveyor, and where the second bearing surface is arranged to interact with a lower bearing surface of the guide rail such that the pallet is guided in a sideway direction at the linear magnetic conveyor.

BRIEF DESCRIPTION OF THE FIGURES

The invention will be described in greater detail in the following, with reference to the embodiments that are shown in the attached drawings, in which.

DETAILED DESCRIPTION OF VARIOUS EMBODIMENTS

Figure 1:
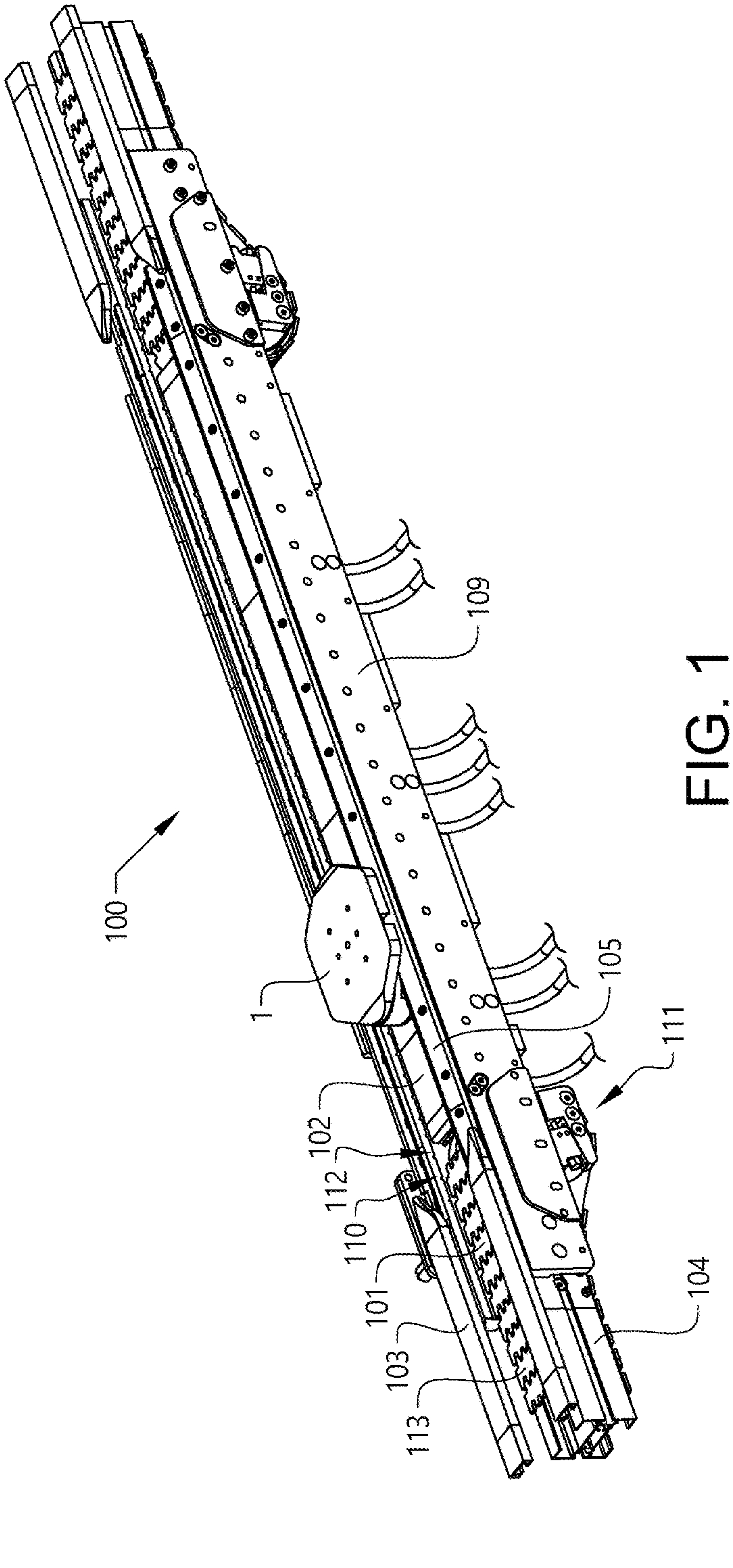
FIG. 1 shows part of a conveyor track according to the invention, wherein a pallet according to the invention is located on the conveyor track.

The embodiments of the invention with further developments described in the following are to be regarded only as examples and are in no way to limit the scope of the protection provided by the patent claims. References such as longitudinal, horizontal, vertical, right, left etc. refer to directions of a conveyor in normal use.

FIGS. 1 to 3 and 6 to 8 show a conveyor track according to the invention, and FIGS. 4 to 8 show a pallet according to the invention to be used with the conveyor track.

The conveyor track 100 comprises an endless conveyor 101 and a linear magnetic conveyor 102. The endless conveyor 101 is in the shown example a conventional plastic chain conveyor arranged to convey pallets in straight lines and through curves, bends, diverters etc. The endless conveyor may also be a belt conveyor, a roller conveyor or another type of endless conveyor. The endless conveyor comprises support rails 103 arranged at each side of the endless conveyor. The support rails will support the pallet in a sideway direction when the pallet is conveyed by the endless conveyor. The support rails are arranged to interact with gliding surfaces 14 of the pallet 1 and are mounted to the conveyor beam 104 with mounting brackets.

The endless conveyor 101 may comprises one or more endless conveyor chains, depending on the size and design of the conveyor system. In the shown conveyor system, two conveyor chains are used. Each conveyor chain comprises a drive unit and an idler unit, arranged at each end of the conveyor chain where the conveyor chain changes direction. An endless chain conveyor can be designed in a flexible way and may comprise curves, bends, diverters, stops etc. The endless conveyor is arranged to convey pallets to and from the linear magnetic conveyor 102. The endless conveyor 101 moves continuously with a constant speed.

The shown conveyor track further comprises at least one linear magnetic conveyor 102. The magnetic conveyor is arranged at e.g. a loading station or a workstation where it is of advantage to control the position of the pallet in a precise manner. The magnetic conveyor comprises a linear motor that can control a pallet individually with respect to speed and position. The linear motor comprises a plurality of electromagnetic coils that control the movement of the pallet at the magnetic conveyor. The pallet 1 comprises a magnetic material such that it can be driven by the magnetic conveyor. The magnetic material may be a magnetic metal or a permanent magnet of some kind. The magnetic conveyor can drive and position the pallet with a very high precision and with a high speed.

The magnetic conveyor 102 can control several pallets at the same time. It is thus possible to provide a small queue of pallets, e.g. two to four pallets, at the magnetic conveyor such that an empty pallet can be quickly positioned at e.g. a delivery position when another pallet has been filled with products. In this way, the continuous flow of the infeed conveyor must not be stopped or slowed down when a new pallet is positioned at the pick-up position.

In one example, the magnetic conveyor is arranged at a loading station. At the loading station, individual products arrive one and one from a production machine of some kind. It may be toothpaste tubes arriving from a toothpaste-filling machine, candy bars arriving from a candy bar wrapping machine, or the like. Common for all products is that they arrive one by one in a continuous flow on an infeed conveyor, and that the products are to be packed in bundles comprising two or more products. The products are loaded in a product holder on a pallet 1. The product holder comprises a plurality of holding positions, where each holding position is adapted to hold a product. The products are held in parallel, with the products arranged next to each other. In one example, the product holder comprises four holding positions. A suitable number of holding positions of a product holder may be between two and ten. The products arrive on the infeed conveyor in a continuous manner. It is thus of great importance that the holding positions of the pallet can be positioned at the delivery position in a quick and precise manner, such that the continuous flow of the infeed conveyor must not be stopped.

The magnetic conveyor 102 comprises a guide rail 105 arranged at each side of the magnetic conveyor, arranged to guide and support the pallet at the magnet conveyor.

The magnetic conveyor 102 thus comprises two individual guide rails 105.

The guide rails 105 are configured to interact with guide wheels 9-12 of the pallet 1 for enabling motion of the pallet 1 along the length of the magnetic conveyor 102. The electromagnetic coils of the magnetic conveyor 102 are thus arranged for controlling the movement of the pallet 1 along the magnetic conveyor 102, and the guide rails 105 are arranged for carrying the load of the pallet 1 guiding the pallet 1 sideways.

Figure 2:
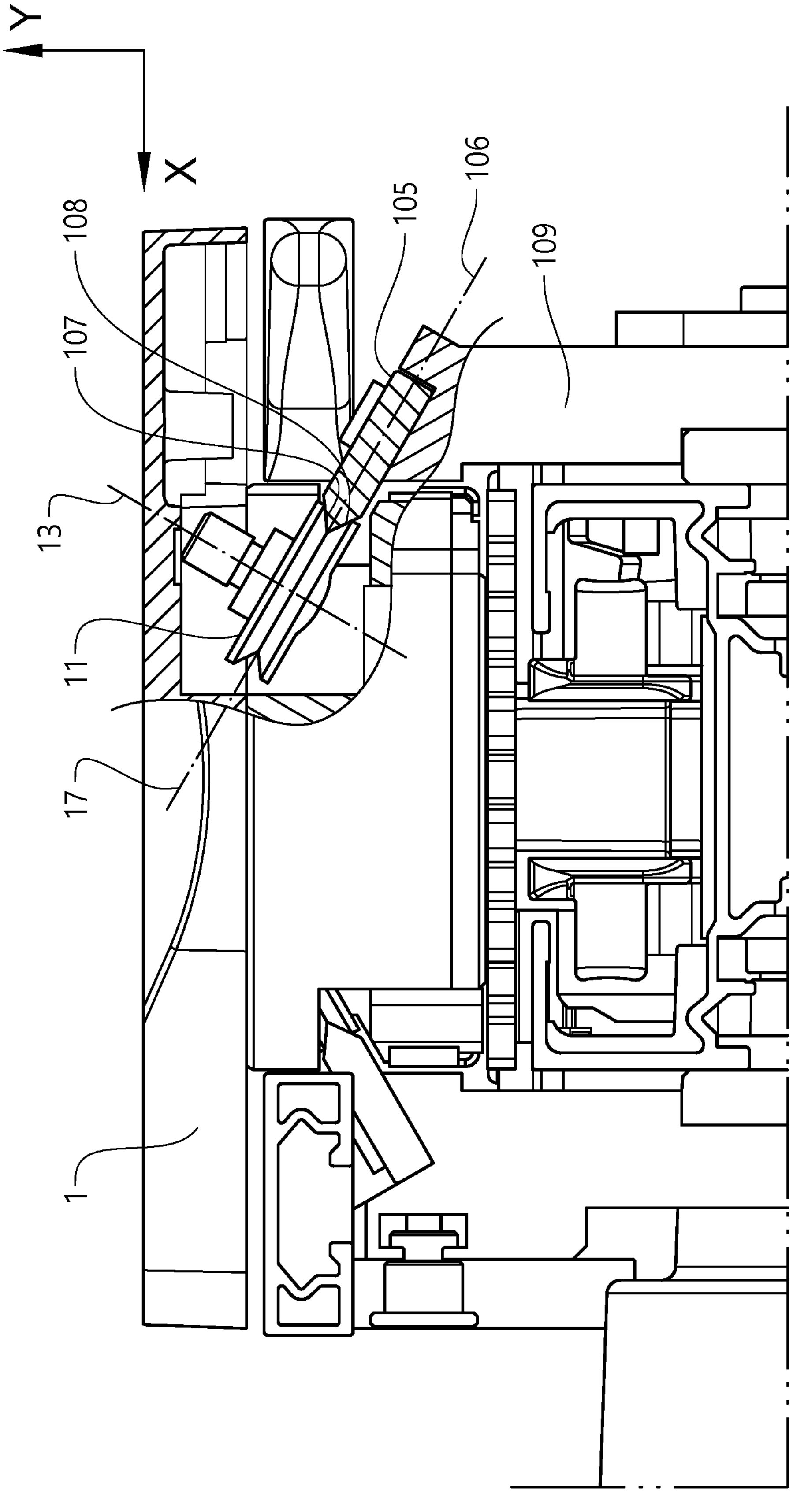
FIG. 2 shows a cross section of a conveyor track according to the invention, and a cross section of a pallet according to the invention located on the conveyor track.
Figure 3:
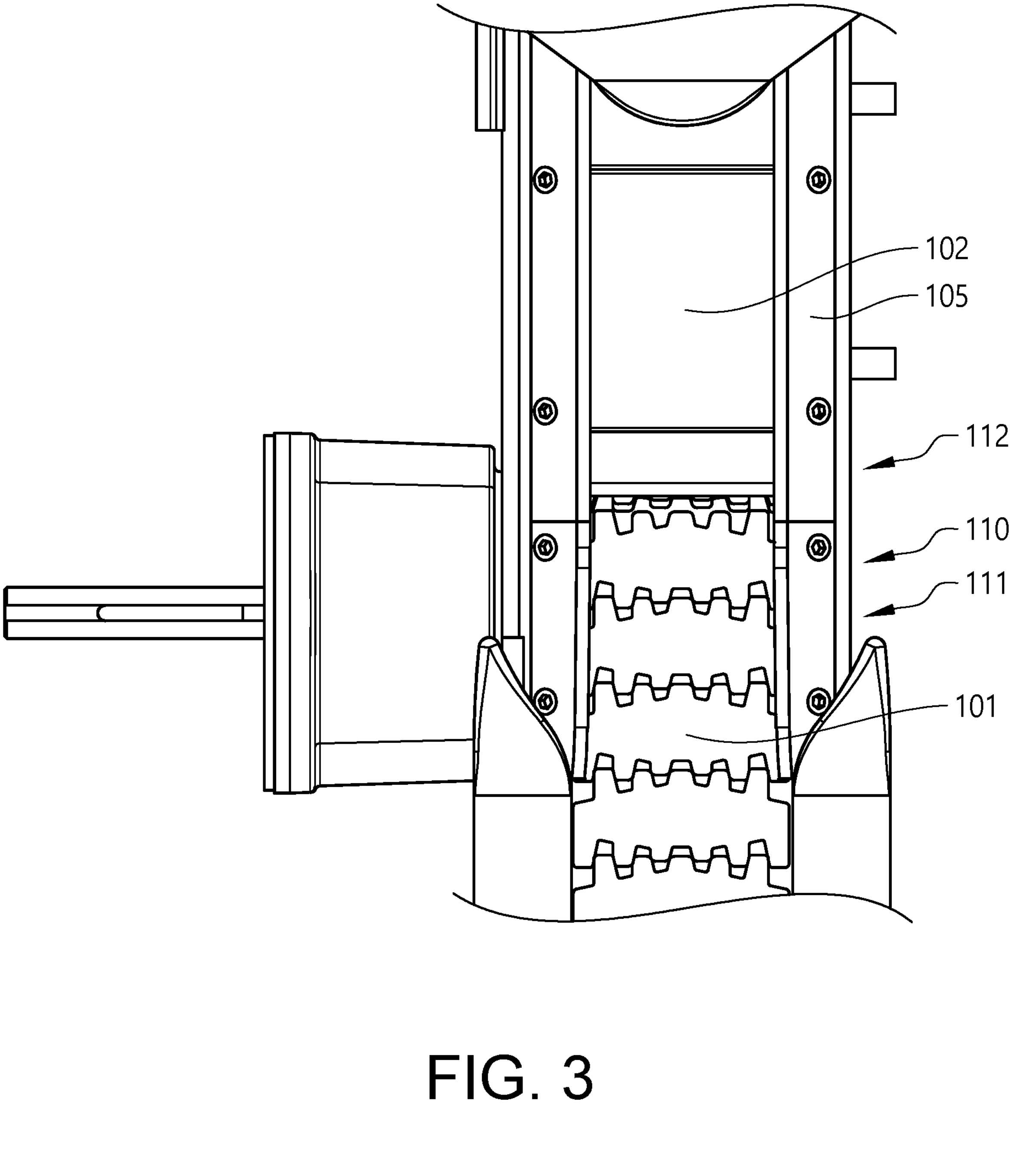
FIG. 3 shows a detail of the conveyor track according to the invention.
Figure 4:
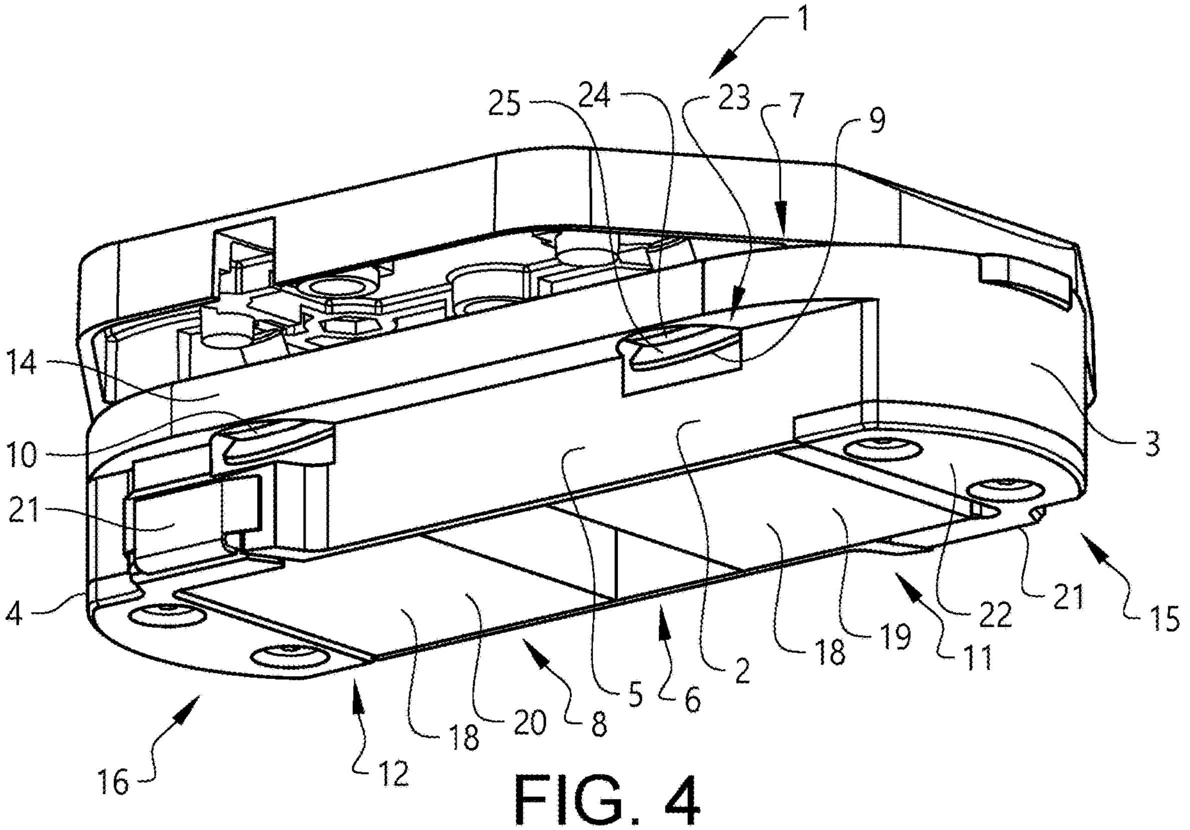
FIG. 4 shows a first example of a pallet according to the invention for the conveyor track according to the invention.

In the shown example of FIG. 2, the guide rail 105 is pointed and the centre axle 106 of the guide rail 105 is inclined with respect to a horizontal direction or x-axle of the conveyor track. The guide rail may also be convex and semi-circular with an inclined centre axle. The guide rail may also be provided with a groove that is V-shaped and adapted to cooperate with pointed guide wheels, or may be provided with a concave and semi-circular groove adapted to cooperate with convex and semi-circular guide wheels.

The inclination angle of the guide rail is preferably between 20 to 45 degrees. The guide rail 105 will support the pallet in a vertical direction and will guide the pallet in a horizontal direction. A guide rail is provided with an upper bearing surface 107 and a lower bearing surface 108, where the upper bearing surface will carry the load of the pallet, and the lower bearing surface will guide the pallet sideways. The guide rail will interact with guide wheels of the pallet that are provided with grooves, either V-shaped grooves or concave semi-circular grooves. The guide wheels are arranged with the same inclination angle as the guide rail with respect to a horizontal direction, where the rotational axle of a guide wheel is perpendicular to the centre axle of the guide rail.

As illustrated in the example embodiment of FIG. 2, an inclination plane 17 of a guide wheel 11 is the same as the inclination of the centre axle 106 of the associated guide rail 105.

In some example embodiments, a cross-section of the guide rail 105, arranged in a plane perpendicular to a longitudinal direction of the guide rail 105, may have an elongated shape, wherein a direction of elongation of said cross-section of the guide rail 105 is parallel with the centre axle 106 of the guide rails 105. For example, in the example embodiment of FIG. 2, the cross-section of the guide rail 105 is oblong, wherein a central direction of elongation of said oblong cross-section is parallel with the centre axle 106 of the guide rails 105.

Figure 6:
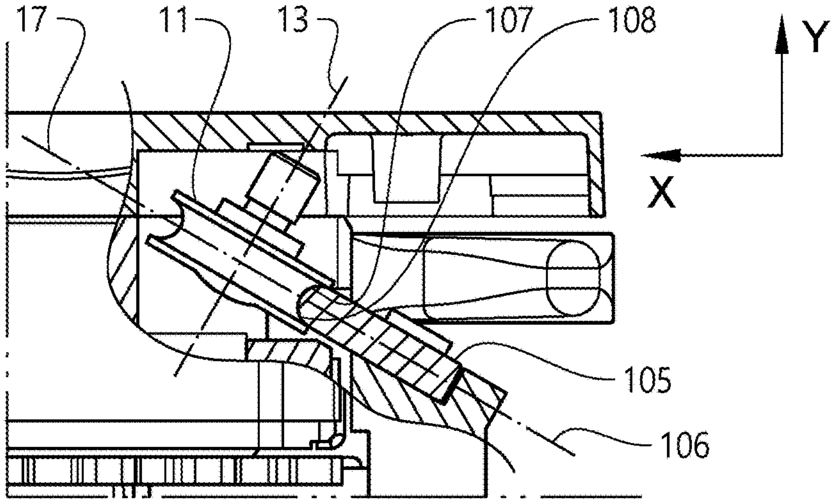
FIG. 6 shows guide rails have convex and semi-circular cross-sectional shape, and pulley wheels having a groove according to the invention.

FIG. 6 shows a further example embodiment of the conveyor track and pallet according to the present disclosure, wherein the guide rails 105 have convex and semi-circular cross-sectional shape when viewed in a longitudinal direction of track. The pointed guide rail 105 is provided with an upper bearing surface 107 and a lower bearing surface 108, where the upper bearing surface 107 will carry the load of the pallet, and the lower bearing surface 108 will guide the pallet sideways. The pallet is provided with pulley wheels 11 that are provided with a groove that corresponds to the shape of the guide rail 105. The groove may thus be a semi-circular concave groove arranged to cooperate with a semi-circular guide rail 105. The pulley wheels 11 are arranged with the rotational axle 13 being inclined with respect to a horizontal direction X, where the rotational axle 13 of a pulley wheel 11 is perpendicular to the centre axle of the guide rail.

Figure 7:
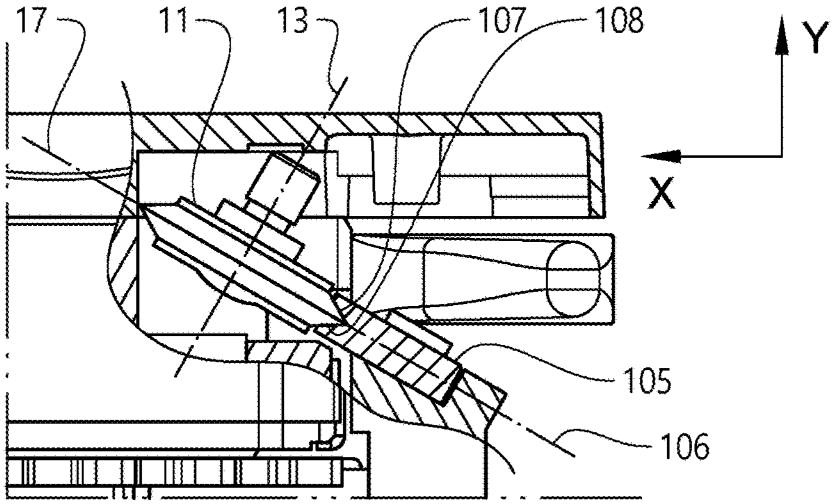
FIG. 7 shows guide rails having a V-shaped groove adapted to cooperate with pointed guide wheels according to the invention.

With reference to FIG. 7, the guide rail may according to a further example embodiment of the conveyor track and pallet be provided with a groove that is V-shaped and adapted to cooperate with pointed guide wheels 11. The grooved guide rail 105 is provided with an upper bearing surface 108 and a lower bearing surface 107, where the upper bearing surface 108 will carry the load of the pallet, and the lower bearing surface 107 will guide the pallet sideways. The pallet is provided with pointed V-shaped pulley wheels 11 that are provided with a convex shape that corresponds to the shape of the V-shaped groove of the guide rail 105.

Figure 8:
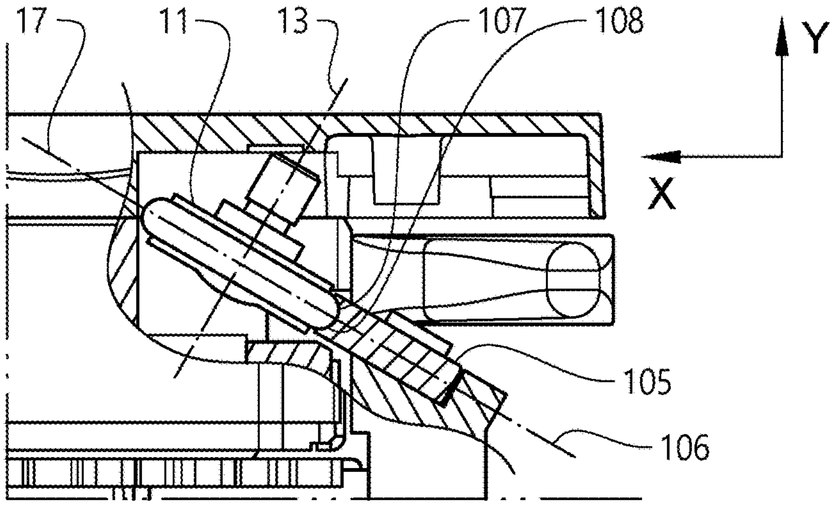
FIG. 8 shows a guide rail provided with a concave and semi-circular groove adapted to cooperate with convex and semi-circular guide wheels according to the invention.

Still more alternatively, as schematically illustrated in FIG. 8, the guide rail may according to a further example embodiment of the conveyor track and pallet be provided with a concave and semi-circular groove adapted to cooperate with convex and semi-circular guide wheels 11 of the pallet.

The guide rail 105 will ensure that the pallet is supported with small tolerances and with low friction. This allows the pallet to be controlled in a fast and precise manner. The guide rails will support the pallet such that there is a small air gap between the support surface 22 of the pallet and the surface of the magnetic conveyor. The distance between the support surface 22 of the pallet and the surface of the magnetic conveyor is preferably between 0.3 to 0.6 mm, and the distance between the magnetic means 18 and the surface of the magnetic conveyor is preferably between 0.1 to 0.3 mm.

The angle between the upper bearing surface 107 and the lower bearing surface 108 is equal to or less than 90 degrees, and may e.g. be between 60 to 80 degrees for a pointed guide rail. The angle between the upper bearing surface 107 and the lower bearing surface 108 will depend on the inclination angle of the centre axle 106 of the guide rail. The upper bearing surface 107 is preferably arranged such that it is horizontal. The angle between the centre axle 106 and the upper bearing surface 107 is the same as the angle between the centre axle 106 and the lower bearing surface 108.

At the entrance section 110 of the guide rails, the guide rail is curved with a large radius. The entrance section is curved in both a horizontal direction and a vertical direction. The radius may e.g. be 50 cm or more. The curved entrance section allows the pallet to gently enter the guide rail and to be gently supported by the guide rail. The surface of the endless conveyor is arranged slightly above the surface of the magnetic conveyor, in the shown example by 0.3 mm, such that the pallet can move in the same plane both at the endless conveyor and at the magnetic conveyor. If the support surface 22 of the pallet and/or the surface of a chain conveyor is worn, the pallet may be lifted slightly from the surface of the chain conveyor. Due to the curved entrance section, this lifting is very gentle. The entrance section will also guide the pallet in a sideway direction in a gentle manner.

When the pallet arrives at the entrance section, the front part of the pallet will engage with the guide rails by the front guide wheels of the pallet. At the same time the front part of the pallet leaves the endless conveyor and is supported by the guide rails. Here, the front part is held slightly above the magnetic conveyor and the pallet will only be pushed at the rear part of the pallet. When the rear guide wheels also engage with the guide rails, the pallet will only be conveyed by the magnetic conveyor. The entrance section 110 is arranged at the end region 111 of the endless conveyor, such that the pallet will be supported by the guide rail before the pallet enters the magnetic conveyor.

The pallet 1 that is to be used with the conveyor track 100 comprises a body 2 having a front side 3, a rear side 4, right side 5, a left side 6, an upper side 7 and a bottom side 8. The right side 5 is provided with a first guide wheel 9 and a second guide wheel 10, and the left side 6 is provided with a third guide wheel 11 and a fourth guide wheel 12. The guide wheels are arranged at the same height and symmetrical with respect to the front side and the rear side. The guide wheels are further inclined with respect to a horizontal direction. The inclination plane 17 of a guide wheel is the same as the inclination of the centre axle 106 of the guide rails 105. The rotational axle 13 of each guide wheel is perpendicular to the inclination plane 17. The pallet is provided with a stop lug 21 at each side of the pallet, which can be used to stop a pallet with a stop member.

A guide wheel is provided with a groove 23, in the shown example a V-shaped groove, having a first bearing surface 24 and a second bearing surface 25, where the first bearing surface 24 will bear on the upper bearing surface 107 of the guide rail, and where the second bearing surface 25 will interact with the lower bearing surface 108 of the guide rail such that the pallet is guided in a sideway direction. The guide wheels may also be pointed with a V-shape adapted to cooperate with a guide rail provided with a V-shaped groove or may be provided with a convex and semi-circular shape adapted to cooperate with a guide rail having a concave and semi-circular shape.

With a semi-circular shape, the horizontal part of the groove will correspond to the first bearing surface 24 that carries the load of the pallet, and the vertical part of the groove will correspond to the second bearing surface 25 that guides the pallet in a sideway direction.

The guide wheels may also be pointed with a V-shape adapted to cooperate with a guide rail provided with a V-shaped groove or may be provided with a convex and semi-circular shape adapted to cooperate with a guide rail having a concave and semi-circular shape.

The bottom side 8 of the pallet is provided with a support surface 22 at the front part 15 and the rear part 16 of the pallet, on which the pallet stands when it is conveyed by the endless conveyor. The support surface may be made e.g. from plastic, steel or stainless steel and may be replaceable. The support surface is arranged slightly below the lower surface of the magnetic material 18 of the pallet. The distance between the lower surface of the magnetic material and the support surface may be between 0.1 to 0.3 mm, and is in the shown example 0.2 mm. This will allow the support surface to wear some during use, which may be the case when a pallet is stopped at a workstation. The endless conveyor continues to move, and there will be some wear on the support surface and/or the endless conveyor, depending on the used materials. If the support surface is too worn, it can be replaced.

During a transition from the endless conveyor to the magnetic conveyor, the front guide wheels will engage the guide rail, which will guide and support the pallet at the front part while the rear part is driven by the endless conveyor. The guide rail will support the pallet such that the front part does not bear on the magnetic conveyor. Thereafter, the rear guide wheels will engage the guide rail and the pallet will be driven only by the magnetic conveyor, since the rear part has also left the endless conveyor. By supporting the pallet with the guide rails during the transition from the endless conveyor to the magnetic conveyor, the pallet will be guided over the gap between the endless conveyor and the magnetic conveyor.

The bottom side 8 of the pallet 1 is provided with a magnetic material 18. The magnetic material may be a magnetic metal or permanent magnets. In one example, shown in FIG. 4, the magnetic material consists of a front magnet 19 and a rear magnet 20. Where the front magnet 19 is arranged at the front part 15 of the pallet and the rear magnet 20 is arranged at the rear part 16 of the pallet. In this example, the magnets are arranged symmetrical to the rotational axles 13 of the guide wheels. In this way, the pallet will not have any specific direction and can be conveyed in any direction, with both the front side 3 or the rear side 4 pointing in the conveyed direction. The pallet will also behave in the same way regardless of orientation at the magnetic conveyor.

Figure 5:
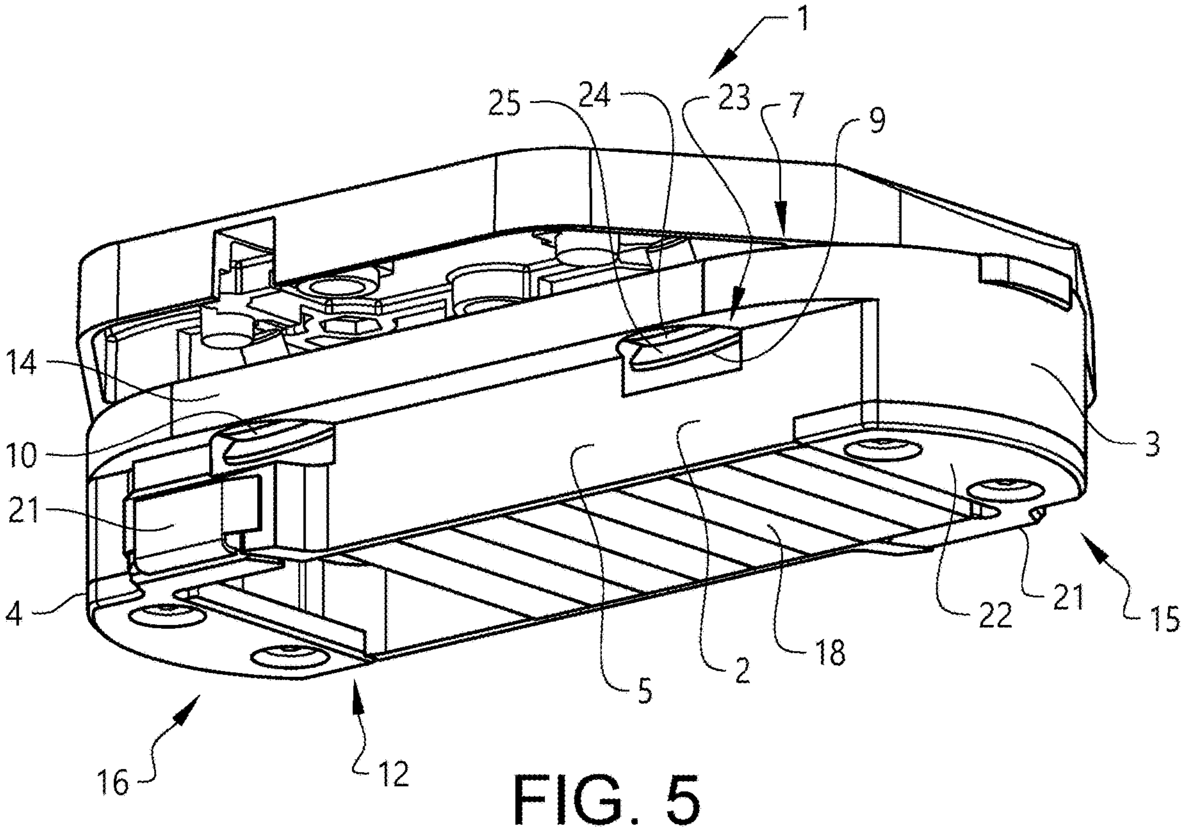
FIG. 5 shows a second example of a pallet according to the invention for the conveyor track according to the invention.

In another example, shown in FIG. 5, the magnetic material consists of one larger magnet arranged towards the front part 15 of the pallet. In this example, the magnet is arranged asymmetrical in the pallet. In this way, the pallet is directional and is adapted to be conveyed with the front side 3 pointing in the conveyed direction. Since there are more magnetic material at the front part of the pallet, the pallet is better suited to bridge the gap between the endless conveyor and the magnetic conveyor, and the magnetic conveyor will be able to drive the pallet in a more reliable manner. It would also be possible to provide the complete bottom part with magnetic material, but this will increase the cost and weight. It is thus of advantage to limit the amount of used magnetic material. The used amount is also dependent on the payload of the pallet and the required acceleration of the pallet.

The horizontal direction or x-axle of the magnetic conveyor 102, as illustrated in FIG. 2, may be parallel with a central flat upper surface of the magnetic conveyor 102 that is located between the guide rails 105 of the magnetic conveyor 102, i.e. the same upper surface of the magnetic conveyor that defines the air gap between the bottom of the pallet and the surface of the magnetic conveyor when the pallet is held by the guide rails on the magnetic conveyor.

The invention is not to be regarded as being limited to the embodiments described above, a number of additional variants and modifications being possible within the scope of the subsequent patent claims. The conveyor track may comprise any number of magnetic conveyors, and the pallet may have any size or shape.

REFERENCE SIGNS

1: Pallet
2: Body
3: Front side
4: Rear side
5: Right side
6: Left side
7: Upper side
8: Bottom side
9: First guide wheel
10: Second guide wheel
11: Third guide wheel
12: Fourth guide wheel
13: Rotational axle
14: Gliding surface
15: Front part
16: Rear part
17: Inclination plane
18: Magnetic means
19: Front magnet
20: Rear magnet
21: Stop lug
22: Support surface
23: V-shaped groove
24: First bearing surface
25: Second bearing surface
100: Conveyor track
101: Endless conveyor
102: Linear magnetic conveyor
103: Support rail
104: Conveyor beam
105: Guide rail
106: Centre axle
107: Upper bearing surface
108: Lower bearing surface
109: Side support
110: Entrance section
111: Endless conveyor end region
112: Gap
113: Conveyor chain

The invention claimed is:

1. Conveyor track (100) comprising an endless conveyor (101) and a linear magnetic conveyor (102), wherein the conveyor track (100) is arranged to convey a pallet (1) with both the endless conveyor (101) and the linear magnetic conveyor (102), wherein the endless conveyor (101) is a chain conveyor or a belt conveyor or a roller conveyor, wherein the endless conveyor (101) comprises support rails (103) arranged at each side of the endless conveyor (101), wherein the support rails (103) are configured for supporting the pallet (1) sideways when the pallet (1) is conveyed by the endless conveyor (101), wherein the linear magnetic conveyor (102) comprise guide rails (105) arranged at each side of the linear magnetic conveyor (102), wherein the guide rails (105) are arranged to support and guide the pallet (1) on the linear magnetic conveyor (102), wherein the linear magnetic conveyor (102) is configured to drive the pallet (1) by means of magnetic material that is provided on the pallet (1), wherein each guide rail (105), in a plane perpendicular to a longitudinal direction of the guide rail (105), has an elongated cross-section with a central direction of elongation that is inclined with respect to a horizontal direction, and wherein the guide rails (105) comprise an entrance section (110) arranged at each end of the guide rails (105).

2. Conveyor track according to claim 1, wherein the guide rails (105) are pointed.

3. Conveyor track according to claim 1, wherein the guide rails (105) are convex and semi-circular.

4. Conveyor track according to claim 1, wherein the guide rails (105) comprise a V-shaped groove.

5. Conveyor track according to claim 1, wherein the guide rails (105) comprise a concave and semi-circular groove.

6. Conveyor track according to claim 1, wherein a guide rail (105) comprises an upper bearing surface (107) and a lower bearing surface (108).

7. Conveyor track according to claim 6, wherein the angle between the upper bearing surface (107) and the lower bearing surface (108) is between 60 to 90 degrees.

8. Conveyor track according to claim 1, wherein the centre axle (106) is inclined with between 30 to 45 degrees with respect to a horizontal direction.

9. Conveyor track according to claim 1, wherein the entrance section (110) is curved and is provided with a radius.

10. Conveyor track according to claim 9, wherein the radius is at least 50 cm.

11. Pallet (1) for a conveyor system, wherein the pallet (1) is adapted to be conveyed by both an endless conveyor and a linear magnetic conveyor, wherein the pallet (1) comprises a body (2) having a front side (3), a rear side (4), right side (5), a left side (6), an upper side (7) and a bottom side (8), where the right side (5) is provided with a first guide wheel (9) and a second guide wheel (10), where the left side (6) is provided with a third guide wheel (11) and a fourth guide wheel (12), wherein the right side (5) and the left side (6) of the body (2) are provided with gliding surfaces (14) arranged to interact with support rails (103) of an endless conveyor (101), wherein the bottom side (8) of the body (2) is provided with a support surface (22) at a front part (15) and a rear part (16) of the pallet (1), such that the pallet (1) is configured to stand on the support surface (22) when the pallet (1) is conveyed by the endless conveyor (101), and where the bottom side (8) of the pallet (1) is provided with a magnetic material (18) such that the pallet (1) can be driven by the linear magnetic conveyor, wherein the rotational axle (13) of each guide wheel (9, 10, 11, 12) is inclined with respect to a vertical direction.

12. Pallet according to claim 11, wherein the rotational axle (13) of each guide wheel is inclined between 30 to 60 degrees.

13. Pallet according to claim 11, wherein each guide wheel (9, 10, 11, 12) is provided with a groove (23).

14. Pallet according to claim 13, wherein the groove (23) is V-shaped.

15. Pallet according to claim 13, wherein the groove (23) is concave and semi-circular.

16. Pallet according to claim 11, wherein each guide wheel (9, 10, 11, 12) is pointed with a V-shape.

17. Pallet according to claim 11, wherein each guide wheel (9, 10, 11, 12) is convex and semi-circular.

18. Pallet according to claim 11, wherein the magnetic material (18) is positioned symmetrical with respect to the guide wheels (9, 10, 11, 12).

19. Pallet according to claim 11, wherein the magnetic material (18) is positioned towards the front side (3) of the pallet (1).

20. Pallet according to claim 19, wherein the magnetic material (18) overlaps the first guide wheel (9) and the third guide wheel (11).

21. Pallet according to claim 19, wherein the magnetic material (18) does not overlap the second guide wheel (10) or the fourth guide wheel (12).

22. Conveyor system comprising a conveyor track comprising an endless conveyor (101) and a linear magnetic conveyor (102), and a plurality of pallets (1) according to claim 11.

* * * * *